(12) United States Patent
Wu

(10) Patent No.: US 7,798,651 B2
(45) Date of Patent: Sep. 21, 2010

(54) FIXING MECHANISM FOR FIXING A LIGHT VALVE AND A THERMAL MODULE OF AN OPTICAL ENGINE AND RELATED OPTICAL ENGINE

(75) Inventor: Li-Han Wu, Hsin-Chu (TW)

(73) Assignee: Young Optics Inc., Hsinchu Science Park, Hsin-Chu (TW)

( * ) Notice: Subject to any disclaimer, the term of this patent is extended or adjusted under 35 U.S.C. 154(b) by 464 days.

(21) Appl. No.: 12/031,719

(22) Filed: Feb. 15, 2008

(65) Prior Publication Data
US 2008/0246923 A1  Oct. 9, 2008

(30) Foreign Application Priority Data
Apr. 9, 2007 (TW) ............... 96112297 A

(51) Int. Cl.
G03B 21/14 (2006.01)
(52) U.S. Cl. ............ 353/52; 353/31; 353/119; 348/771
(58) Field of Classification Search ......... 353/31, 353/33, 34, 37, 52, 56, 119; 349/5, 8; 359/58, 359/60, 161; 348/771
See application file for complete search history.

(56) References Cited

U.S. PATENT DOCUMENTS

| | | | |
|---|---|---|---|
| 6,322,217 B1* | 11/2001 | Fujimori et al. | 353/31 |
| 6,733,141 B2* | 5/2004 | Lee | 353/122 |
| 6,834,964 B2* | 12/2004 | Nishihara et al. | 353/52 |
| 7,114,811 B2* | 10/2006 | Arai et al. | 353/20 |
| 7,275,833 B2* | 10/2007 | Saito | 353/52 |
| 7,661,823 B2* | 2/2010 | Terada et al. | 353/33 |
| 2002/0131026 A1* | 9/2002 | Fujimori | 353/119 |
| 2004/0150798 A1* | 8/2004 | Tsao et al. | 353/75 |
| 2005/0185145 A1* | 8/2005 | Halsberghe et al. | 353/33 |
| 2005/0195460 A1* | 9/2005 | Fujimori et al. | 359/237 |
| 2006/0209265 A1* | 9/2006 | Terada et al. | 353/33 |
| 2007/0126997 A1* | 6/2007 | Kang | 353/99 |
| 2008/0055558 A1* | 3/2008 | Tang et al. | 353/33 |
| 2010/0091201 A1* | 4/2010 | Koyama et al. | 349/5 |

FOREIGN PATENT DOCUMENTS

TW 549474 8/2003
TW 566572 12/2003

* cited by examiner

*Primary Examiner*—William C Dowling
(74) *Attorney, Agent, or Firm*—Winston Hsu

(57) ABSTRACT

A fixing mechanism includes a first fixing component, a second fixing component, a first elastic component, a second elastic component, and a third elastic structure. The first fixing component has a first end, and a second end where a first holding surface is disposed. The second fixing component has a first end fixed on the optical engine, and a second end where a second holding surface is disposed. The first elastic component has a first end connected to the first holding surface and a second end connected to an interface board. The second elastic component has a first end connected to the second holding surface and a second end connected to the interface board. The third elastic structure has a first side connected to the first holding surface and the second holding surface, and a second side located opposite to the first side and connected to the thermal module.

18 Claims, 11 Drawing Sheets

FIXING MECHANISM FOR FIXING A LIGHT VALVE AND A THERMAL MODULE OF AN OPTICAL ENGINE AND RELATED OPTICAL ENGINE

BACKGROUND OF THE INVENTION

1. Field of the Invention

The present invention relates to a fixing mechanism and a related optical engine, and more particularly, to a fixing mechanism for fixing a light valve and a thermal module of an optical engine and the related optical engine.

2. Description of the Prior Art

Please refer to FIG. 1. FIG. 1 is a schematic view of a projector in the prior art. The projector 10 includes an optical engine 12 including a covering 14, a light source 16, a converging lens 20, a color wheel 22, an integration rod 24, a condenser lens 26, a stop 28, a relay lens 30, a total reflection prism system 32, a light valve 34, and a projection lens 36. The covering 14 is for covering internal components of the optical engine 12. The light source 16 includes a parabolic reflector 161. Light beams 18, generated by the light source 16 are reflected by the parabolic reflector 161 and pass through the converging lens 20 and then converge into the color wheel 22 that is formed by a series of red, green and blue filters. After the light beams 18 pass through the color wheel 22 to be transformed into colored light beams 181, the colored light beams 181 enter the integration rod 24 to uniform the brightness of the colored light beams 181, and then sequentially pass through the condenser lens 26, the stop 28, and the relay lens 30, and finally converge into the prism illumination system 32 which is capable of reflecting the colored light beams 181 with a reflection surface 321 onto the light valve 34. The light valve 34 is formed with a plurality of pixel lens which are disposed in a matrix and capable of pivotably rotating within a range of +12 to −12 degrees. The light valve 34 can be a digital micro-mirror device (DMD). When the light valve 34 is in an ON state, the pixel lenses reflect an incident light beam onto the projection lens 36. When the light valve 34 is in an OFF state, the pixel lenses reflect an incident light beam onto a region outside of the projection lens 36. The light valve 34 selectively reflects the colored light beams 181 through the prism illumination system 32 and further through the projection lens 36 and finally projecting onto the screen 38. The projector 10 further includes a housing 40 and a control unit 42. The housing 40 is for covering the optical engine 12 and the control unit 42. The control unit 42 is electrically connected to the light valve 34 for switching the light valve 34 in the ON or OFF state.

The size of the projector 10 and the optical engine 12 thereof are getting smaller trendily causing increase of the thermal density in the condition of the same light power so that the temperature of the light valve 34 inside the optical engine 12 increases accordingly. When the inner temperature of the projector 10 increases, the operating stability reduces, especially for the precise light valve 34. For solving the above-mentioned problem, a thermal module is installed on the light valve 34 for dissipating heat generated by the light valve 34. Please refer to FIG. 2 and FIG. 3. FIG. 2 is a diagram illustrating the combination of the light valve and a thermal module in the prior art. FIG. 3 is an exploded drawing illustrating the combination of the light valve and the thermal module in the prior art. The optical engine 12 further includes the thermal module 44, a fixing mechanism 46, and an interface board 52. The thermal module 44 is disposed on a side of the light valve 34 and connected to the light valve 34 for dissipating heat generated by the light valve 34. The light valve 34 and the thermal module 44 are fixed on the covering 14 of the optical engine 12 with different fixing components and different elastic components respectively. The fixing mechanism 46 includes a plurality of fixing components 48a, 48b, 48c, 48d which can be screws, and a plurality of elastic components 50a, 50b, 50c, 50d which can be springs and sleeve on the fixing components 48a, 48b, 48c, 48d respectively. The fixing components 48a, 48b, 48c, 48d pass through the interface board 52 and are screwed to the covering 14 of the optical engine 12. One end of each elastic components 50a, 50b, 50c, 50d is connected to one of the fixing components 48a, 48b, 48c, 48d. The other end of each elastic components 50a, 50b, 50c, 50d is connected to the interface board 52. The fixing mechanism 46 further includes a fixing means 54 which can be a screw, and an elastic means 56 which can be a wire spring or a clip. The light valve 34 is fixed on the covering 14 of the optical engine 12 by the fixing components 48a, 48b, 48c, 48d and the elastic components 50a, 50b, 50c, 50d. The thermal module 44 is fixed on the interface board 52 by the fixing means 54 and the elastic means 56.

For reducing numbers of the fixing components for the light valve and the fixing means for the thermal module, the fixing component and the fixing means can be integrated as one piece. Please refer to FIG. 4. FIG. 4 is a diagram illustrating the combination of the light valve 34 and the thermal module 44 according to another embodiment in the prior art. The fixing mechanism 58 includes a plurality of fixing means 60 and a plurality of elastic means 62 which are sleeved on the fixing means 60 respectively. The fixing means 60 can be screws, and the elastic means can be springs. The fixing mechanism 58 further includes an interface board 64. The fixing means 60 pass through the interface board 64 and screwed to the covering 14 of the optical engine 12. One end of the elastic means 62 is connected to the fixing means 60, and the other end of the fixing means 62 is connected to the thermal module 44. Besides, the fixing mechanism 58 further includes an elastic component 66 which can be a leaf spring or a clip. Two ends of the elastic component 66 are connected to holding surfaces of the fixing means 60 respectively, and a central part of the elastic component 66 presses against the interface board 64 so as to fix the light valve 34. The light valve 34 is fixed on the covering 14 of the optical engine 12 by the fixing means 60 and the elastic component 66. The thermal module 44 is fixed on the covering 14 of the optical engine 12 by the fixing means 60 and the elastic means 62. It means that the light valve 34 and the thermal module 44 are fixed on the covering 14 of the optical engine 12 by the same fixing means 60 but different elastic components (the elastic component 66 and the elastic means 62). Because holding positions of the elastic component 66 and the elastic means 62 are different, there is a need to apply special screws or other components to provide different holding surfaces. As shown in FIG. 4, corresponding holding surfaces of the fixing means 60 need to be lathed for providing the two ends of the elastic component 66 to lean against.

In conclusion, there are more and complicated fixing components of the fixing mechanism for fixing the light valve and the thermal module so as to provide different holding surfaces for the elastic components of the light valve and the thermal module, and the assembly procedure is more complicated.

There is a need to find an efficient fixing mechanism with low cost for fixing the light valve and the thermal module.

SUMMARY OF THE INVENTION

A fixing mechanism for fixing a light valve and a thermal module of an optical engine and the related optical engine for solving the above-mentioned problem are provided.

In order to achieve the aforementioned and other advantages, according to an embodiment of the present invention, a fixing mechanism for fixing a light valve of an optical engine and a thermal module is provided. The thermal module is disposed on a side of the light valve and connected to the light valve for dissipating heat generated by the light valve. The optical engine further includes an interface board installed between the light valve and the thermal module. The fixing mechanism includes a first fixing component installed on a side of the light valve and passing through the thermal module and the interface board. The first fixing component includes a first end fixed on the optical engine and a second end on which a first holding surface is disposed. The fixing mechanism further includes a second fixing component installed on the other side of the light valve and passing through the thermal module and the interface board. The second fixing component includes a first end fixed on the optical engine and a second end on which a second holding surface is disposed. The fixing mechanism further includes a first elastic component having a first end connected to the first holding surface and a second end connected to the interface board. The fixing mechanism further includes a second elastic component having a first end connected to the second holding surface and a second end connected to the interface board. The fixing mechanism further includes a third elastic structure having a first side connected to the first holding surface and the second holding surface and a second side located opposite to the first side and connected to the thermal module.

According to an embodiment of the present invention, an optical engine includes a covering, a light valve installed on the covering, a thermal module disposed on a side of the light valve and connected to the light valve for dissipating heat generated by the light valve, an interface board installed between the light valve and the thermal module, and a fixing mechanism. The fixing mechanism is for fixing the light valve and the thermal module. The fixing mechanism includes a first fixing component installed on a side of the light valve and passing through the thermal module and the interface board. The first fixing component includes a first end fixed on the optical engine and a second end on which a first holding surface is disposed. The fixing mechanism further includes a second fixing component installed on the other side of the light valve and passing through the thermal module and the interface board. The second fixing component includes a first end fixed on the optical engine and a second end on which a second holding surface is disposed. The fixing mechanism further includes a first elastic component having a first end connected to the first holding surface and a second end connected to the interface board. The fixing mechanism further includes a second elastic component having a first end connected to the second holding surface and a second end connected to the interface board. The fixing mechanism further includes a third elastic structure having a first side connected to the first holding surface and the second holding surface and a second side located opposite to the first side and connected to the thermal module.

Other objectives, features and advantages of the present invention will be further understood from the further technology features disclosed by the present invention wherein there are shown and described preferred embodiments of this invention, simply by way of illustration of modes best suited to carry out the invention.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
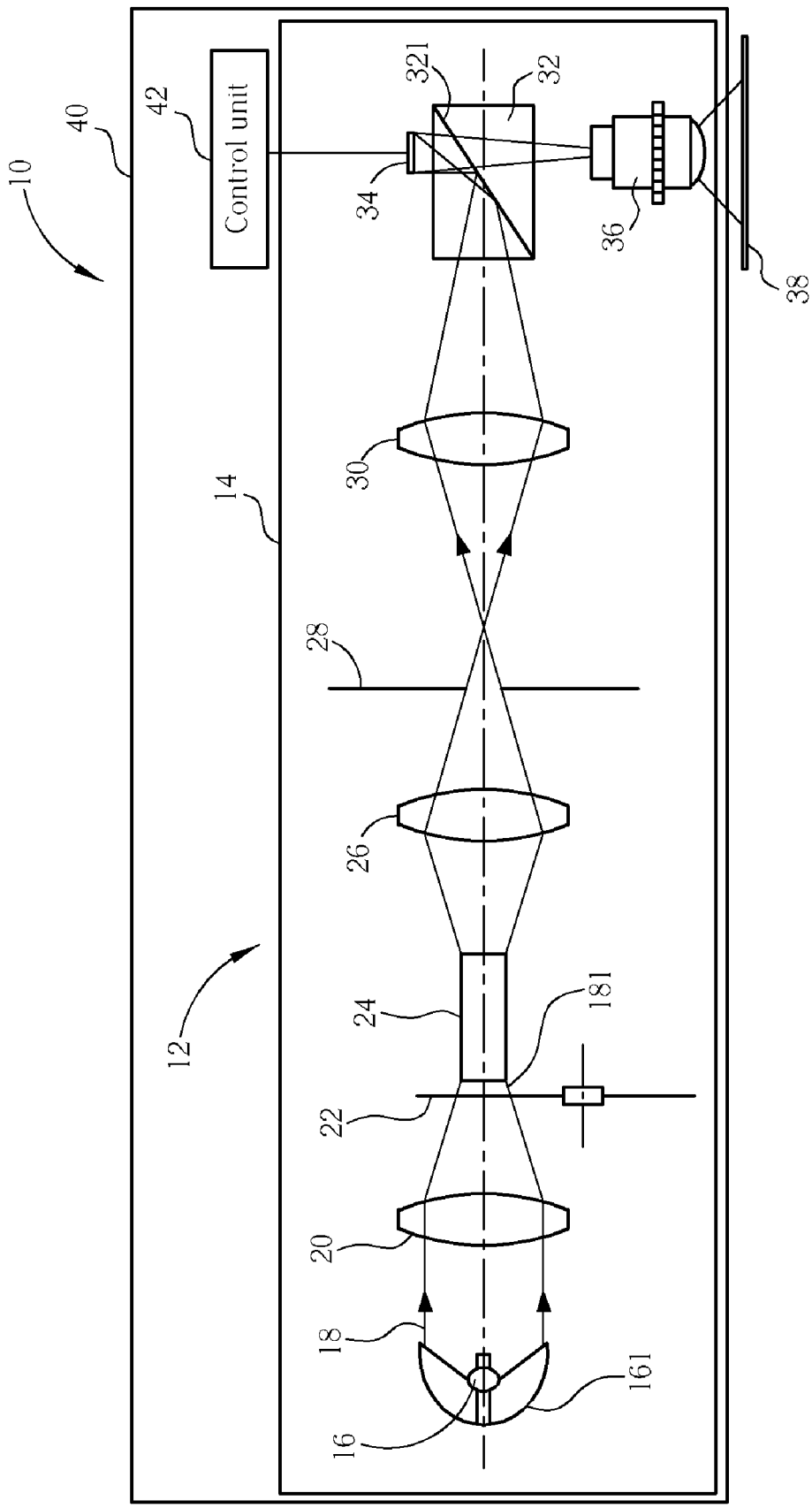
FIG. 1 is a schematic view of a projector in the prior art.
Figure 2:
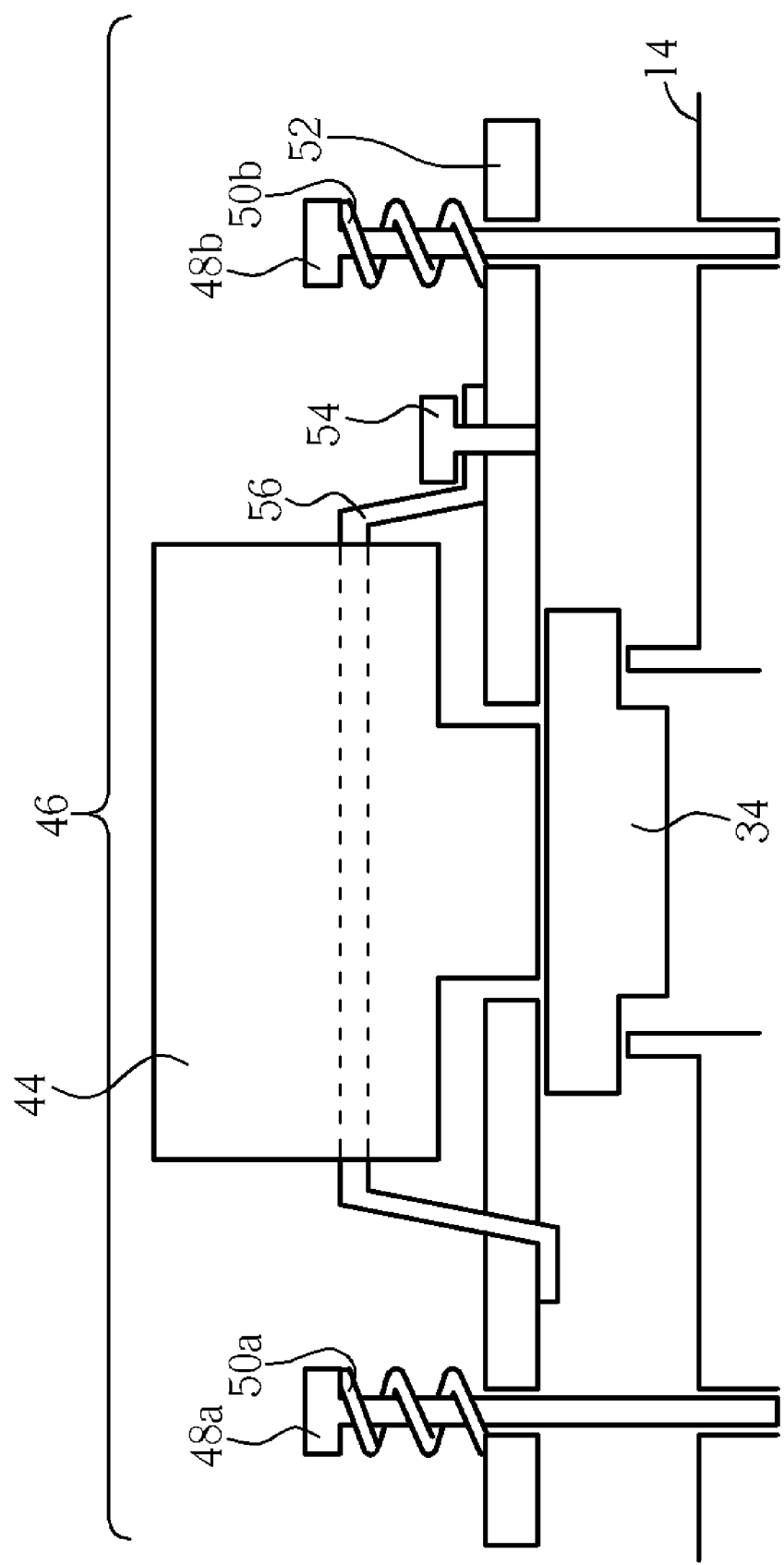
FIG. 2 is a diagram illustrating the combination of a light valve and a thermal module in the prior art.
Figure 3:
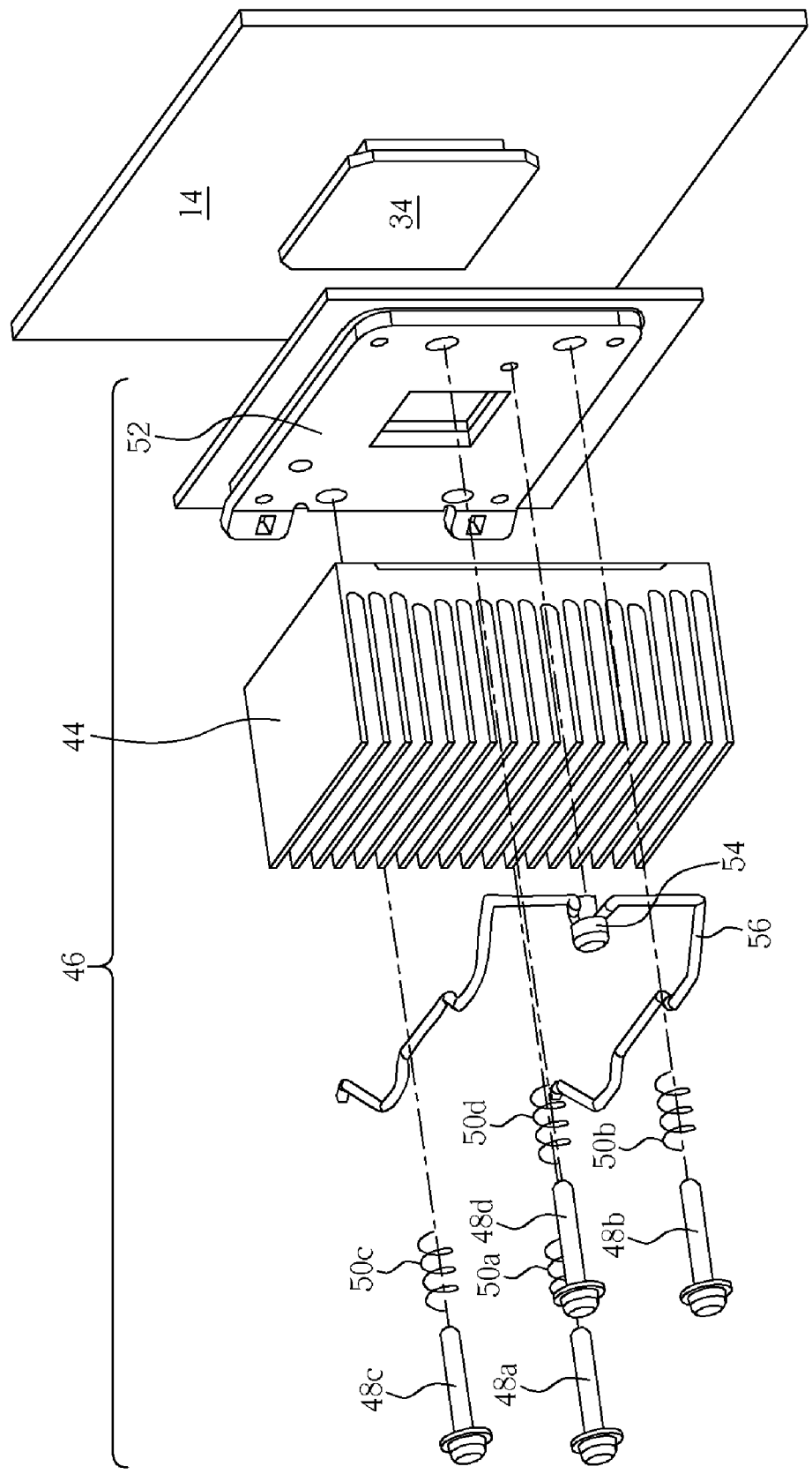
FIG. 3 is an exploded drawing illustrating the combination of the light valve and the thermal module in the prior art.
Figure 4:
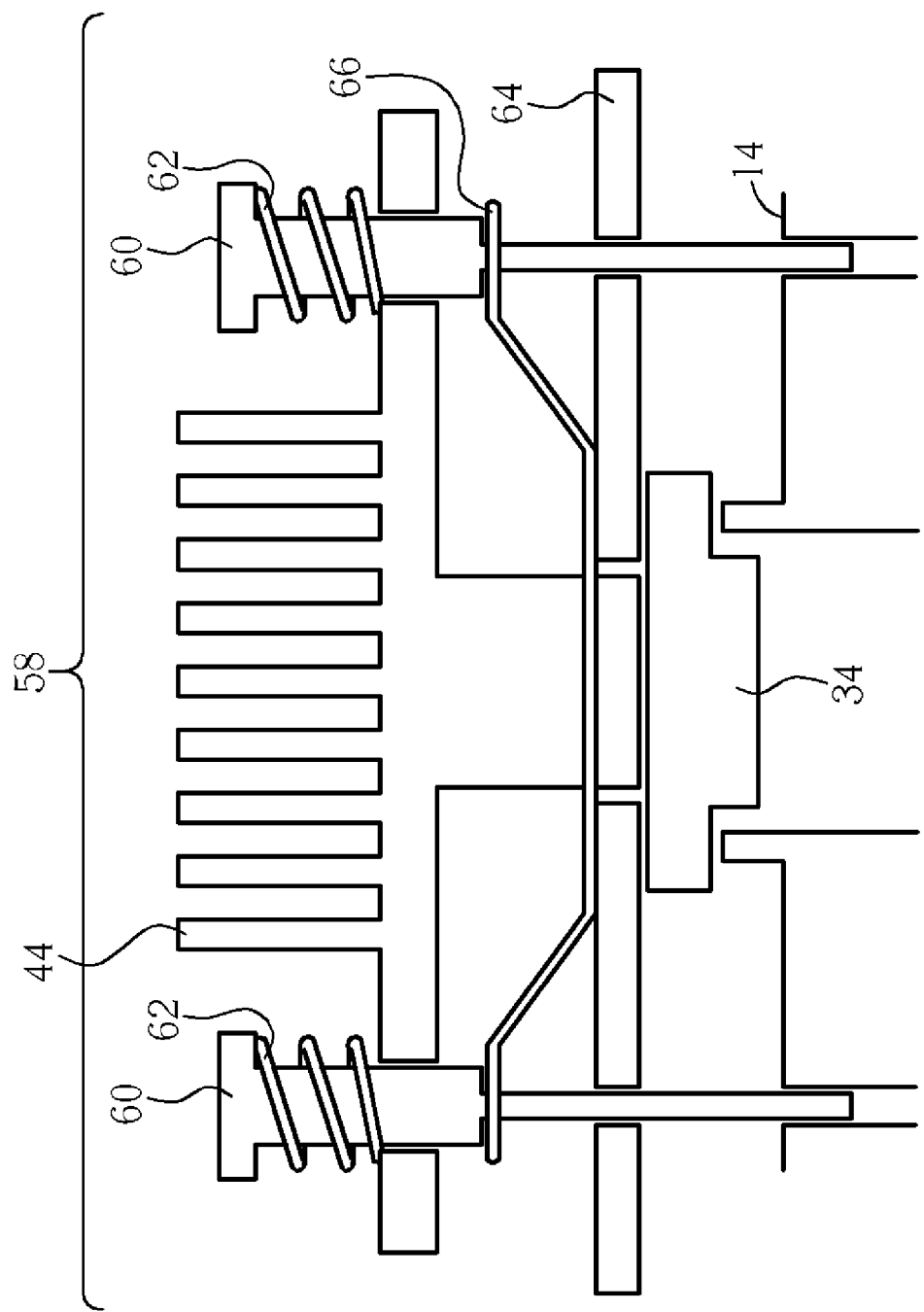
FIG. 4 is a diagram illustrating the combination of the light valve and the thermal module according to another embodiment in the prior art.
Figure 5:
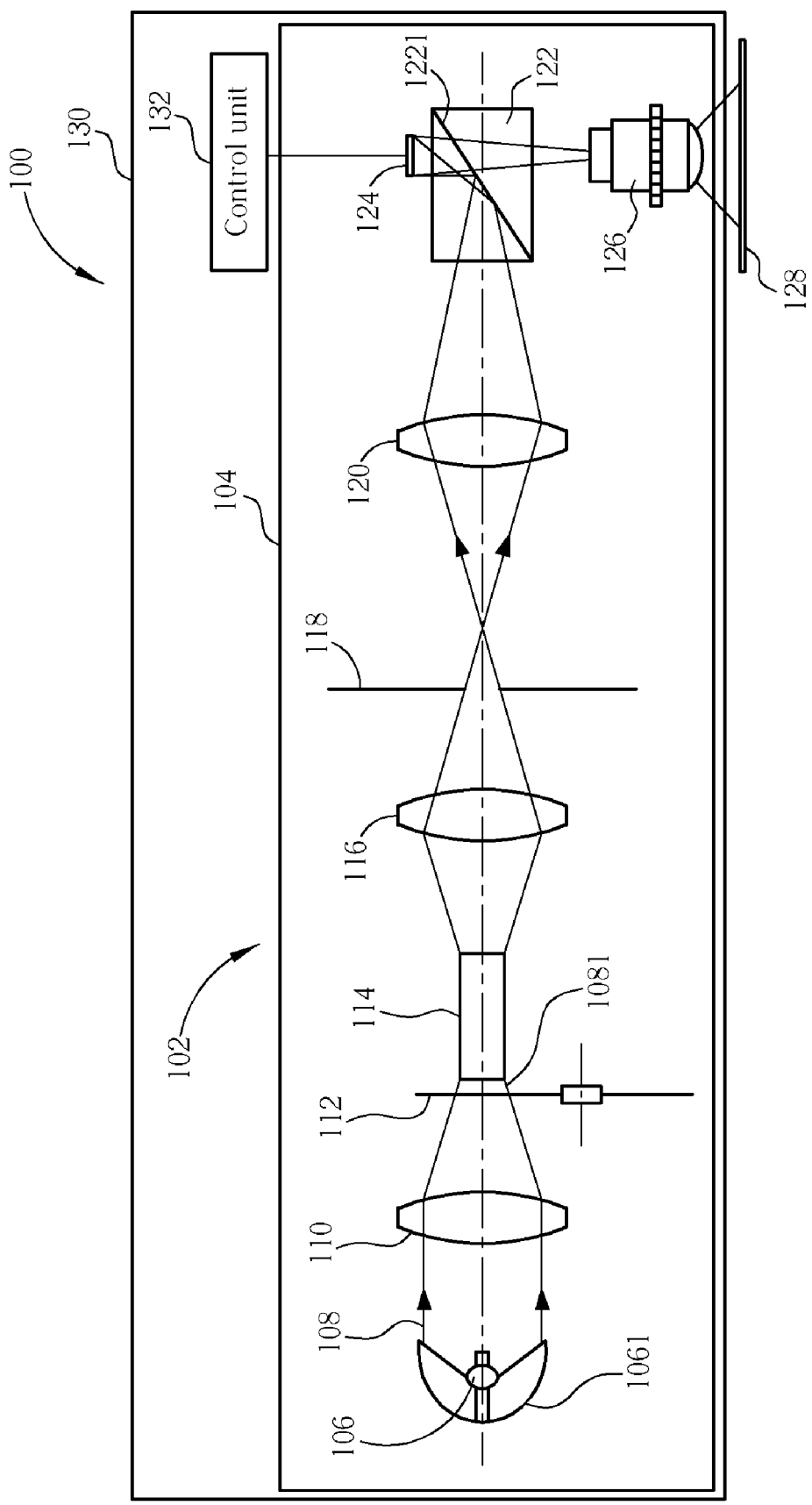
FIG. 5 is a schematic view of a projector according to a preferred embodiment of the present invention.

Please refer to FIG. 5. A projector 100 includes an optical engine 102 including a covering 104, a light source 106, a converging lens 110, a color wheel 112, an integration rod 114, a condenser lens 116, a stop 118, a relay lens 120, a total reflection prism system 122, a light valve 124, and a projection lens 126. The covering 104 is for covering internal components of the optical engine 102. The light source 106 has a parabolic reflector. Light beams 108, generated by the light source 106 are reflected by the parabolic reflector 1061 and pass through the converging lens 110 and then converge into the color wheel 112 that is formed by a series of red, green and blue filters. After the light beams 108 pass through the color wheel 112 to be transformed into colored light beams 1081, the colored light beams 1081 enter the integration rod 114 to uniform the brightness of the colored light beams 1081, and then sequentially pass through the condenser lens 116, the stop 118, and the relay lens 120, and finally converge into the prism illumination system 122 which is capable of reflecting the colored light beams 1081 with a reflection surface 1221 onto the light valve 124. The light valve 124 is formed with a plurality of pixel lens which are disposed in a matrix and capable of pivotably rotating within a range of +12 to −12 degrees. The light valve 124 can be a digital micro-mirror device (DMD). When the light valve 124 is in an ON state, the pixel lenses reflect an incident light beam onto the projection lens 126. When the light valve 124 is in an OFF state, the pixel lenses reflect an incident light beam onto a region outside of the projection lens 126. The light valve 124 selectively reflects the colored light beams 1081 through the prism illumination system 122 and further through a projection lens 126 and finally onto a screen 128. The projector 100 further includes a housing 130 and a control unit 132. The housing 130 is for covering the optical engine 102 and the control unit 132. The control unit 132 is electrically connected to the light valve 124 for switching the light valve 124 in the ON or OFF state.

Figure 6:
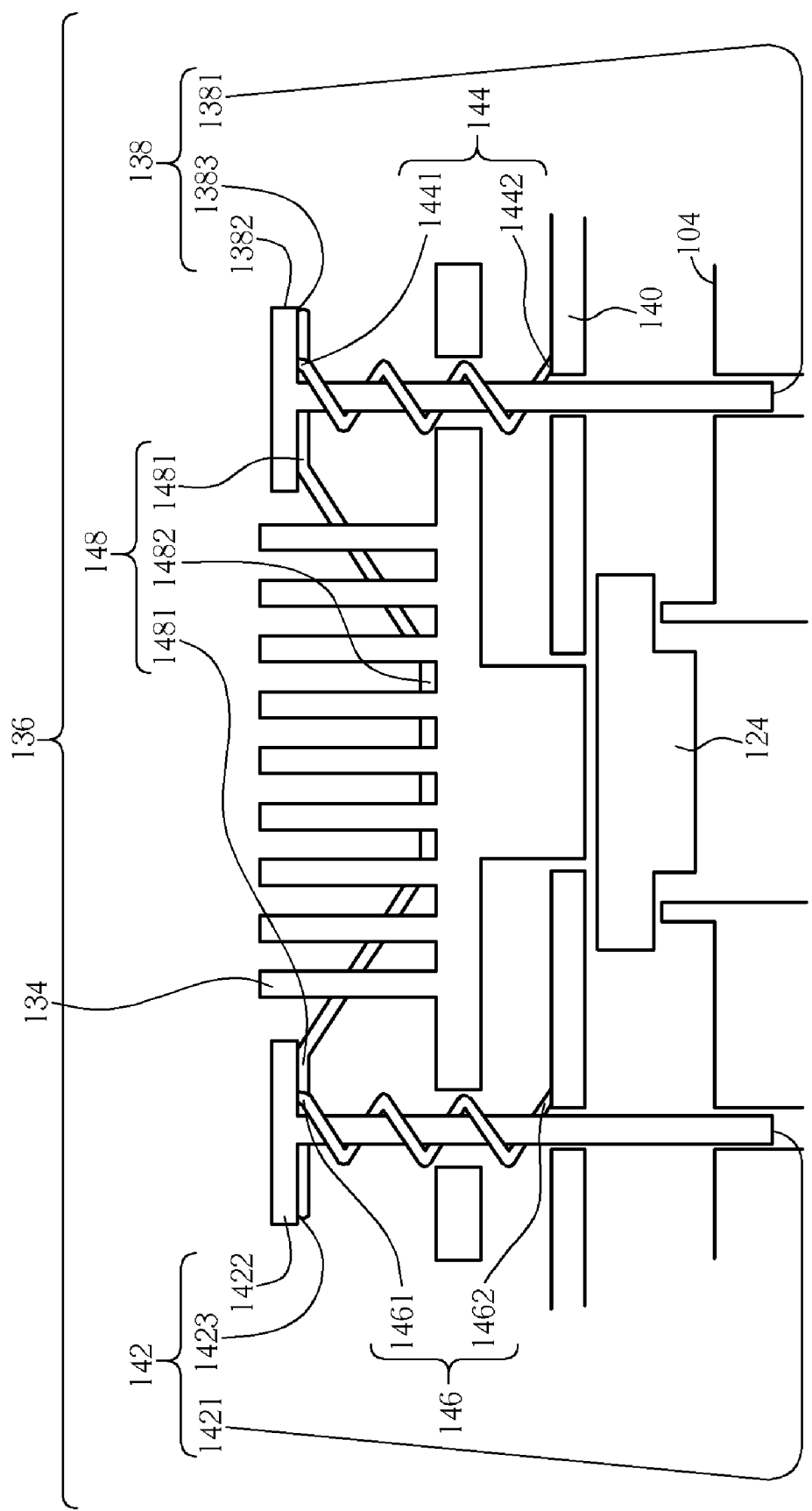
FIG. 6 and FIG. 7 are diagrams illustrating the combination of a light valve and a thermal module according to a first embodiment of the present invention.
Figure 7:
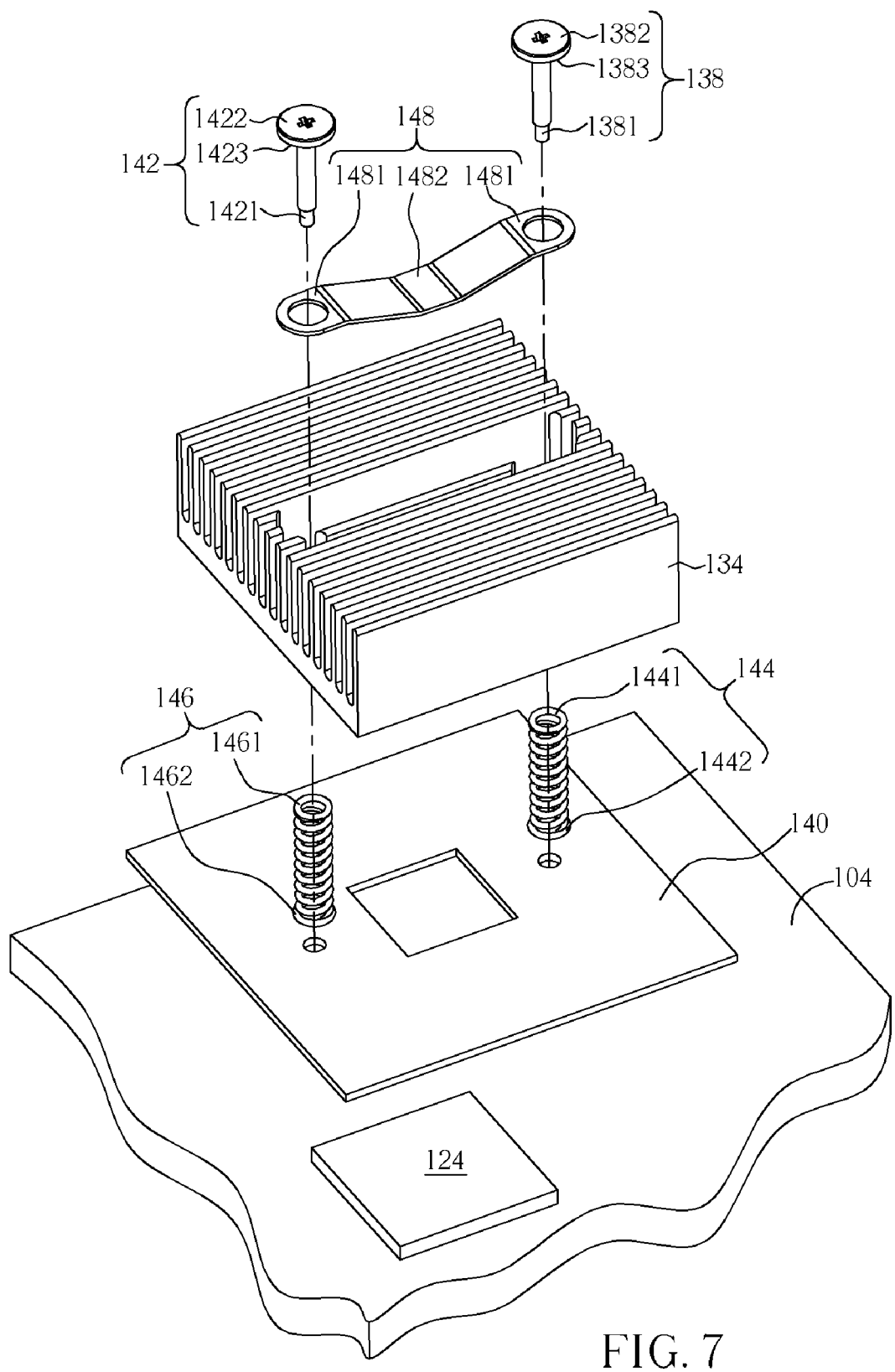

Please refer to FIG. 6 and FIG. 7. FIG. 6 and FIG. 7 are diagrams illustrating the combination of the light valve and a thermal module according to a first embodiment of the present invention. The optical engine 102 further includes the thermal module 134, a fixing mechanism 136, and an interface board 140. The thermal module 134 is disposed on a side of the light valve 124 and connected to the light valve 124 for dissipating heat generated by the light valve 124. The interface board 140 is installed between the light valve 124 and the thermal module 134. The fixing mechanism 136 includes a first fixing component 138, a second fixing component 142, a first elastic component 144, a second elastic component 146, and a third elastic structure 148. The first fixing component 138 is installed on a side of the light valve 124 and passing through the thermal module 134 and the interface board 140. The first fixing component 138 includes a first end 1381 fixed on the covering 104 of the optical engine 102 and a second end 1382 on which a first holding surface 1383 is disposed. The first fixing component 138 can be a screw, and the first end 1381 can be screwed to the covering 104. The first holding surface 1383 can be disposed on a bottom of a nut of the first fixing component 138. The second fixing component 142 is installed on the other side of the light valve 124 and passing through the thermal module 134 and the interface board 140. The second fixing component 142 includes a first end 1421 fixed on the covering 104 of the optical engine 102 and a second end 1422 on which a second holding surface 1423 is disposed. The second fixing component 142 can be a screw, and the first end 1421 can be screwed to the covering 104. The second holding surface 1423 can be disposed on a bottom of a nut of the second fixing component 142.

The first elastic component 144 includes a first end 1441 connected to the first holding surface 1383, and a second end 1442 connected to the interface board 140. The second elastic component 146 includes a first end 1461 connected to the second holding surface 1423, and a second end 1462 connected to the interface board 140. The third elastic structure 148 includes a first side 1481 connected to the first holding surface 1383 of the first fixing component 138 and the second holding surface 1423 of the second fixing component 142, and a second side 1482 located opposite to the first side 1481 and connected to the thermal module 134. The first elastic component 144 and the second elastic component 146 can be springs, such as leaf springs, wire springs, and so on. In this embodiment, the first elastic component 144 and the second elastic component 146 are coil springs, and the first elastic component 144 and the second elastic component 146 are sleeved on the first fixing component 138 and the second fixing component 142 respectively. The third elastic structure 148 can be a leaf spring or a clip. In this embodiment, the third elastic structure 148 is a leaf spring, and the second side 1482 (central part) of the third elastic structure 148 presses the thermal module 134 so as to fix the thermal module 134 on the light valve 124.

The light valve 124 and the thermal module 134 are fixed on the covering 104 of the optical engine 102 by the first fixing component 138, the second fixing component 142, the first elastic component 144, the second elastic component 146, and the third elastic structure 148. In this embodiment, the first end 1441 of the first elastic component 144 for fixing the light valve 124 and the first side 1481 of the third elastic structure 148 for fixing the thermal module 134 are connected to the same first holding surface 1383, and the first end 1461 of the second elastic component 146 for fixing the light valve 124 and the first side 1481 of the third elastic structure 148 for fixing the thermal module 134 are connected to the same second holding surface 1423.

Figure 8:
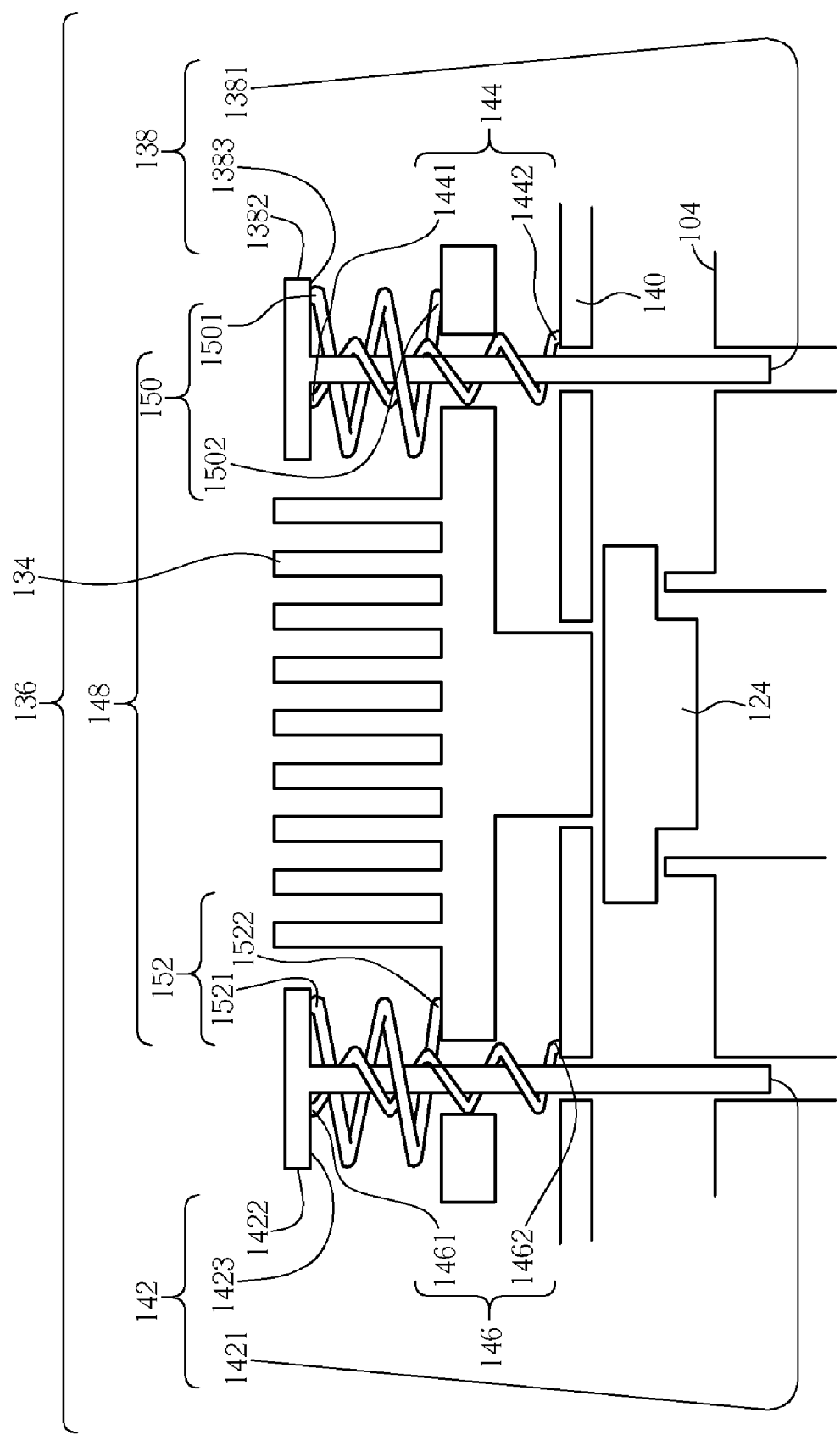
FIG. 8 and FIG. 9 are diagrams illustrating the combination of the light valve and the thermal module according to a second embodiment of the present invention.
Figure 9:
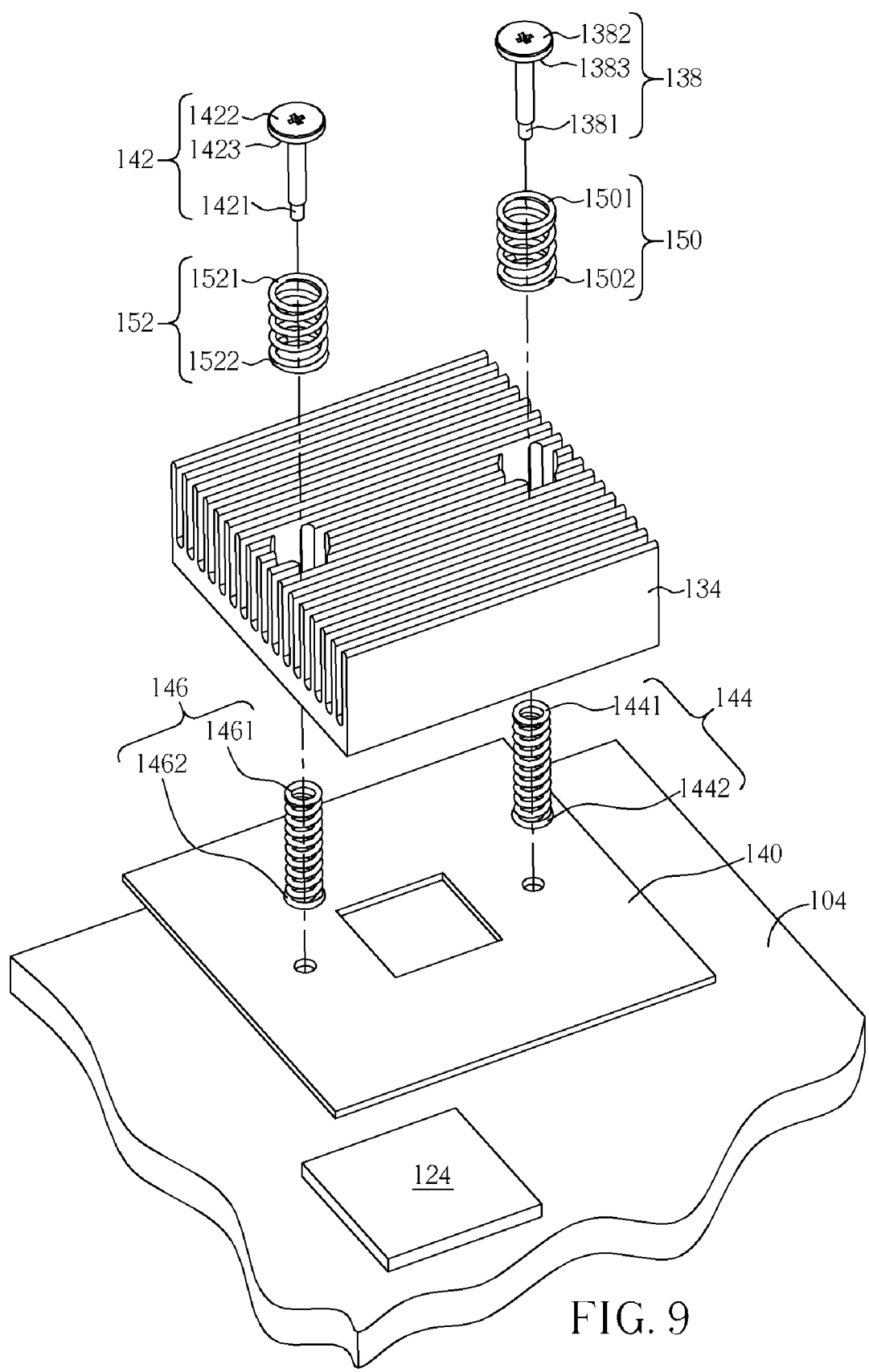

Please refer to FIG. 8 and FIG. 9. FIG. 8 and FIG. 9 are diagrams illustrating the combination of the light valve and the thermal module according to a second embodiment of the present invention. The difference between the second embodiment and the first embodiment is that the third elastic structure 1448 includes a fourth elastic component 150 and a fifth elastic component 152. The fourth elastic component 150 is located in a position corresponding to the first elastic component 144. The fourth elastic component 150 includes a first end 1501 disposed on the first side 1481 shown in FIG. 6 and connected to the first holding surface 1383, and a second end 1502 disposed on the second side 1482 shown in FIG. 6 and connected to the thermal module 134. The fifth elastic component 152 is located in a position corresponding to the second elastic component 146. The fifth elastic component 152 includes a first end 1521 disposed on the first side 1481 shown in FIG. 6 and connected to the second holding surface 1423, and a second end 1522 disposed on the second side 1482 shown in FIG. 6 and connected to the thermal module 134. The fourth elastic component 150 and the fifth elastic component 152 are two coil springs. The first elastic component 144 and the fourth elastic component 150 are sleeved on the first fixing component 138 together, and the second elastic component 146 and the fifth elastic component 152 are sleeved on the second fixing component 142 together.

The light valve 124 and the thermal module 134 are fixed on the covering 104 of the optical engine 102 by the first fixing component 138, the second fixing component 142, the first elastic component 144, the second elastic component 146, the fourth elastic component 150, and the fifth elastic component 152. In this embodiment, the first end 1441 of the first elastic component 144 for fixing the light valve 124 and the first end 1501 of the fourth elastic component 150 for fixing the thermal module 134 are connected to the same first holding surface 1383, and the first end 1461 of the second elastic component 146 for fixing the light valve 124 and the first end 1521 of the fifth elastic component 152 for fixing the thermal module 134 are connected to the same second holding surface 1423.

Figure 10:
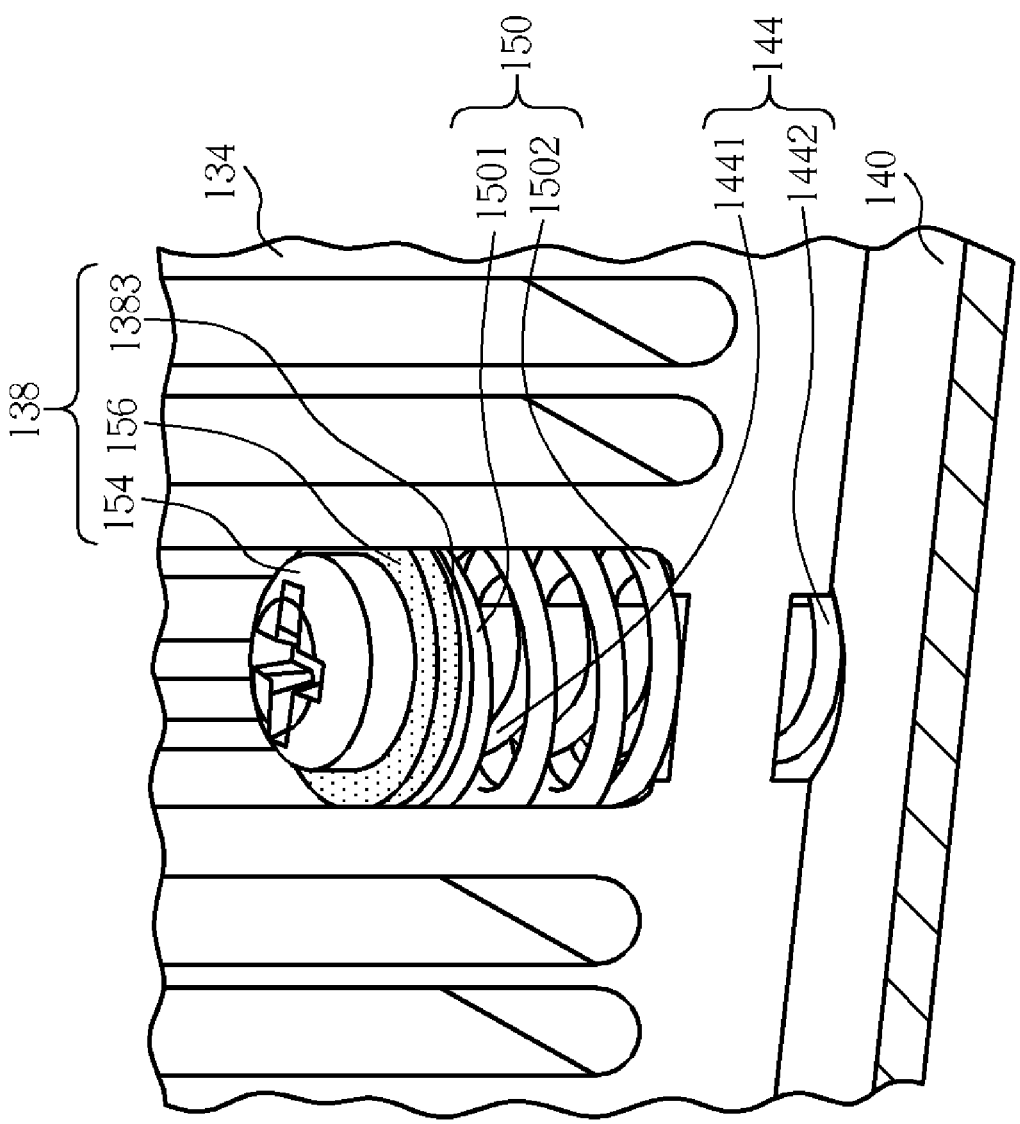
FIG. 10 is an enlarged diagram of a first fixing component, a first elastic component, and a fourth elastic component of a fixing mechanism according to the second embodiment of the present invention.

Please refer to FIG. 10. FIG. 10 is an enlarged diagram of the first fixing component, the first elastic component, and the fourth elastic component of the fixing mechanism according to the second embodiment of the present invention. The difference between this embodiment and the above embodiment is a gasket. The first fixing component 138 includes a screw 154 and a gasket 156 connected to the screw 154. The first holding surface 1383 is disposed on a bottom of the gasket 156. The first elastic component 144 is installed inside the fourth elastic component 150, and the first elastic component 144 and the fourth elastic component 150 are sleeved on the first fixing component 138 together. The first end 1441 of the first elastic component 144 and the first end 1501 of the fourth elastic component 150 contact with the first holding surface 1383 together. The second end 1502 of the fourth elastic component 150 is connected to fins of the thermal module 134. The second end 1442 of the first elastic component 144 is connected to the interface board 140. Similarly, the second fixing component 142, the second elastic component 146, and the fifth elastic component 152 can be designed as the same structure.

Figure 11:
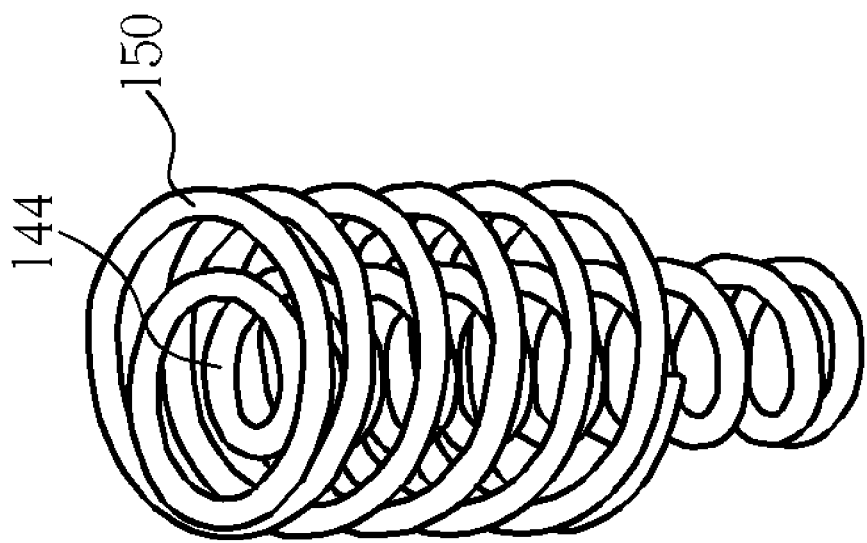
FIG. 11 is a diagram illustrating the integral combination of the first elastic component and the fourth elastic component of a fixing mechanism according to the second embodiment of the present invention.

Please refer to FIG. 11. FIG. 11 is a diagram illustrating the integral combination of the first elastic component and the fourth elastic component of the fixing mechanism according to the second embodiment of the present invention. An end of the first elastic component 144 and the fourth elastic component 150 can contact with the same holding surface via the first elastic component 144 and the fourth elastic component 150 which are formed integrally. Similarly, the second elastic component 146 and the fifth elastic component 152 can be designed as a formed integral structure.

In conclusion, in the embodiments of the present invention it is emphasized that the ends of the elastic components for fixing the light valve 124 and the thermal module 134 are connected to the same holding surface together. The technology in the embodiments of present invention can utilize simply fixing components, such as screws, and there is no need to apply special screws or other components to provide additional holding surfaces or to lathe additional holding surfaces. The elastic components for fixing the light valve 124 and the thermal module 134 can be in any type, and they can be separate or integrated as one piece.

In contrast to the prior art, in the embodiments of the present invention, the ends of the elastic components for fixing the light valve and the thermal module are connected to the same holding surface together. Comparing with the embodiments in the prior art, the embodiments of the present invention utilize simply and less fixing components, and there is no need to apply special screws or other components to provide additional holding surfaces or to lathe additional holding surfaces in the embodiments of the present invention so as to reduce cost and to simplify assembly procedure.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixing mechanism for fixing a light valve of an optical engine and a thermal module, the thermal module being disposed on a side of the light valve and connected to the light valve for dissipating heat generated by the light valve, the optical engine further comprising an interface board installed between the light valve and the thermal module, the fixing mechanism comprising:
   a first fixing component installed on a side of the light valve and passing through the thermal module and the interface board, the first fixing component comprising:
      a first end fixed on the optical engine; and
      a second end on which a first holding surface is disposed;
   a second fixing component installed on the other side of the light valve and passing through the thermal module and the interface board, the second fixing component comprising:
      a first end fixed on the optical engine; and
      a second end on which a second holding surface is disposed;
   a first elastic component comprising:
      a first end connected to the first holding surface; and
      a second end connected to the interface board;
   a second elastic component comprising:
      a first end connected to the second holding surface; and
      a second end connected to the interface board; and
   a third elastic structure comprising:
      a first side connected to the first holding surface and the second holding surface; and
      a second side located opposite to the first side and connected to the thermal module.

2. The fixing mechanism of claim 1 wherein the first fixing component and the second fixing component comprise a screw respectively.

3. The fixing mechanism of claim 2 wherein the first holding surface and the second holding surface are disposed on a bottom of a nut of the screw respectively.

4. The fixing mechanism of claim 2 wherein the first fixing component further comprises a gasket connected to the screw and the first holding surface is disposed on a bottom of the gasket.

5. The fixing mechanism of claim 1 wherein the first elastic component and the second elastic component comprise a coil spring respectively.

6. The fixing mechanism of claim 1 wherein the third elastic structure is a leaf spring.

7. The fixing mechanism of claim 1 wherein the third elastic structure comprises:
    a fourth elastic component located in a position corresponding to the first elastic component, the fourth elastic component comprising:
        a first end disposed on the first side and connected to the first holding surface; and
        a second end disposed on the second side and connected to the thermal module; and
    a fifth elastic component located in a position corresponding to the second elastic component, the fifth elastic component comprising:
        a first end disposed on the first side and connected to the second holding surface; and
        a second end disposed on the second side and connected to the thermal module.

8. The fixing mechanism of claim 7 wherein the fourth elastic component and the fifth elastic component comprise a coil spring respectively.

9. The fixing mechanism of claim 7 wherein the first elastic component and the fourth elastic component are formed integrally or the second elastic component and the fifth elastic component are formed integrally.

10. An optical engine comprising:
    a covering;
    a light valve installed on the covering;
    a thermal module disposed on a side of the light valve and connected to the light valve for dissipating heat generated by the light valve;
    an interface board installed between the light valve and the thermal module; and
    a fixing mechanism comprising:
        a first fixing component installed on a side of the light valve and passing through the thermal module and the interface board, the first fixing component comprising:
            a first end fixed on the optical engine; and
            a second end on which a first holding surface is disposed;
        a second fixing component installed on the other side of the light valve and passing through the thermal module and the interface board, the second fixing component comprising:
            a first end fixed on the optical engine; and
            a second end on which a second holding surface is disposed;
        a first elastic component comprising:
            a first end connected to the first holding surface; and
            a second end connected to the interface board;
        a second elastic component comprising:
            a first end connected to the second holding surface; and
            a second end connected to the interface board; and
        a third elastic structure comprising:
            a first side connected to the first holding surface and the second holding surface; and
            a second side located opposite to the first side and connected to the thermal module.

11. The optical engine of claim 10 wherein the first fixing component comprises a screw.

12. The optical engine of claim 11 wherein the first holding surface is disposed on a bottom of a nut of the screw.

13. The optical engine of claim 11 wherein the first fixing component further comprises a gasket connected to the screw and the first holding surface is disposed on a bottom of the gasket.

14. The optical engine of claim 10 wherein the first elastic component and the second elastic component comprise a coil spring respectively.

15. The optical engine of claim 10 wherein the third elastic structure is a leaf spring.

16. The optical engine of claim 10 wherein the third elastic structure comprises:
    a fourth elastic component located in a position corresponding to the first elastic component, the fourth elastic component comprising:
        a first end disposed on the first side and connected to the first holding surface; and
        a second end disposed on the second side and connected to the thermal module; and
    a fifth elastic component located in a position corresponding to the second elastic component, the fifth elastic component comprising:
        a first end disposed on the first side and connected to the second holding surface; and
        a second end disposed on the second side and connected to the thermal module.

17. The optical engine of claim 16 wherein the fourth elastic component and the fifth elastic component comprise a coil spring respectively.

18. The optical engine of claim 16 wherein the first elastic component and the fourth elastic component are formed integrally or the second elastic component and the fifth elastic component are formed integrally.

* * * * *